United States Patent
Mathur et al.

(10) Patent No.: US 9,856,365 B2
(45) Date of Patent: Jan. 2, 2018

(54) COMPOSITIONS OF POLYHYDRIC ALCOHOLS AND POLYAMIDES

(75) Inventors: Sumit Mathur, Ooltewah, TN (US); Mark Elkovitch, Signal Mountain, TN (US); Vikram Gopal, Ypsilanti, MI (US); Rajeev S. Bhatia, Hixson, TN (US)

(73) Assignee: Radici Plastics USA, Inc., Wadsworth, OH (US)

( * ) Notice: Subject to any disclaimer, the term of this patent is extended or adjusted under 35 U.S.C. 154(b) by 650 days.

(21) Appl. No.: 13/598,765

(22) Filed: Aug. 30, 2012

(65) Prior Publication Data

US 2013/0228728 A1    Sep. 5, 2013

Related U.S. Application Data

(60) Provisional application No. 61/529,418, filed on Aug. 31, 2011.

(51) Int. Cl.
| | |
|---|---|
| *C08K 5/053* | (2006.01) |
| *C08L 77/02* | (2006.01) |
| *C08K 5/06* | (2006.01) |
| *C08L 77/00* | (2006.01) |

(52) U.S. Cl.
CPC .............. *C08K 5/053* (2013.01); *C08K 5/06* (2013.01); *C08L 77/00* (2013.01); *C08L 77/02* (2013.01); *C08K 2201/005* (2013.01)

(58) Field of Classification Search
CPC ...................................................... C08K 5/053
See application file for complete search history.

(56) References Cited

U.S. PATENT DOCUMENTS

| | | | |
|---|---|---|---|
| 4,346,194 A | 8/1982 | Roura | |
| 4,786,673 A | 11/1988 | Morival et al. | |
| 5,242,960 A * | 9/1993 | Ostlinning et al. | 524/126 |
| 5,256,718 A * | 10/1993 | Yamamoto et al. | 524/411 |
| 5,618,865 A | 4/1997 | Martens et al. | |
| 5,726,278 A * | 3/1998 | Kenmochi | 528/310 |
| 5,981,062 A | 11/1999 | Stroud, Jr. et al. | |
| 6,207,737 B1 | 3/2001 | Schell et al. | |
| 6,239,219 B1 | 5/2001 | Breant et al. | |
| 6,579,581 B2 | 6/2003 | Bartz et al. | |
| 6,846,855 B2 | 1/2005 | Campbell et al. | |
| 7,419,721 B2 | 9/2008 | Beerda et al. | |
| 7,671,127 B2 | 3/2010 | Weber et al. | |
| 7,732,047 B2 | 6/2010 | Kashikar | |
| 2008/0146704 A1* | 6/2008 | Kumaraswamy et al. | 524/101 |
| 2009/0062452 A1* | 3/2009 | Harder | C08G 69/26 524/494 |
| 2009/0149590 A1 | 6/2009 | Eroshov et al. | |
| 2010/0029819 A1 | 2/2010 | Palmer et al. | |
| 2011/0028628 A1 | 2/2011 | Martens et al. | |

FOREIGN PATENT DOCUMENTS

| | | |
|---|---|---|
| EP | 1041109 | 10/2001 |
| JP | 2008274305 A | 11/2008 |
| JP | 4284808 B2 | 6/2009 |
| JP | 2012-031393 A | 2/2012 |
| WO | 2008066850 A1 | 6/2008 |
| WO | WO2008132111 A1 | 11/2008 |
| WO | 2009083913 A1 | 7/2009 |
| WO | 2010/014801 A1 | 2/2010 |

OTHER PUBLICATIONS

Baharlou, Simin, International Preliminary Report on Patentability and Written Opinion dated Mar. 4, 2014, for International Patent Application No. PCT/US2012/052974, 13 pages.

* cited by examiner

*Primary Examiner* — Peter F Godenschwager
(74) *Attorney, Agent, or Firm* — LeClairRyan, a Professional Corporation (57) ABSTRACT

The present invention relates to a thermoplastic composition that provides improved thermal aging stability along with durability. The thermoplastic composition comprises a polyamide resin, and a polyhydric alcohol, wherein a majority of the polyhydric alcohol particles have a particle size that is less than about 70 microns. It has been found that a combination of a polyamide resin and a polyhydric alcohol with this particle size produces a superior product demonstrating greater thermal stability and durability than the polyamide resin alone.

18 Claims, 10 Drawing Sheets

0.5% PHA having particle size less than 40 microns 1.5% PHA having particle size less than 40 microns 2.0% PHA having particle size less than 40 microns 35% glass filled heat stabilized hydrolysis resistant Nylon 66

FIG. 11

COMPOSITIONS OF POLYHYDRIC ALCOHOLS AND POLYAMIDES

CROSS-REFERENCE TO RELATED APPLICATION

This application claims benefit of priority from U.S. Provisional Application No. 61/529,418, filed 31 Aug. 2011. This application hereby incorporates by reference U.S. Provisional Application No. 61/529,418 in its entirety.

FIELD OF THE INVENTION

The present invention relates to polyamides having excellent thermal aging resistance and durability.

BACKGROUND OF THE INVENTION

Nylon polymers are desirable in many applications due to its outstanding elasticity, dye-fastness and high melting point. Nylon polymer commonly takes the form of pellets or flakes, which can be melted and shaped for use in plastic applications or extruded as fiber for use in yarn applications, such as apparel, carpet, airbags and outdoor gear.

Nylon resins are often formulated with additives which impart desired properties to the resin, or which solve shortcomings of a resin to make it suitable for other uses. Desired properties include thermal aging resistance and impact resistance. Typically polymer compositions often comprise fillers to modify the mechanical properties of a resin. However, if the fillers are present in large amounts the surface of the articles may have less than desirable quality.

The thermal stability of nylon polymers used for various purposes is a very critical characteristic. When plastic parts such as those used in automobiles and electrical or electronic equipment are exposed to high temperatures for a long period of time, their mechanical properties will decrease due to thermal degradation of the polymers. This kind of phenomena is known as heat aging. In order to prevent such a decrease of mechanical properties, various heat stabilizers are usually added to polymers to improve their heat aging properties. For instance, polyamides are usually stabilized with heat stabilizers including phenolic antioxidant, aromatic amines and copper or copper salt in combination with potassium iodide or potassium bromide.

Phenolic antioxidants or aromatic amines are used for stabilization at temperatures up to 130° C. Copper iodide in combination with potassium iodide and potassium halides are very expensive and the existence of copper is known to cause discoloration problems. However, the rapid developments of the automobile and electronic industries require better thermal stability of polymer materials. To that end, long term use temperatures for polyamide need to be elevated to 210° C. or even higher to 230° C. Therefore, there is a need for polyamide molding compositions which provide improved thermal aging stability along with durability. Furthermore there is a need for improved hydrolysis resistance in a resin with improved thermal aging stability.

SUMMARY OF THE INVENTION

The present invention relates a thermoplastic composition that provides improved thermal aging stability along with durability. The thermoplastic composition comprises a polyamide resin, and a polyhydric alcohol, wherein a majority of the polyhydric alcohol particles have a particle size of 70 microns or less.

An embodiment of the current invention comprises:
a) a polyamide resin; and
b) a polyhydric alcohol, wherein a majority of the polyhydric alcohol particles have a particle size of 70 microns or less.

In another embodiment, the particle size of at least 80% of the polyhydric alcohol particles is 70 microns or less.

In another embodiment, a majority of the polyhydric alcohol particles have a particle size of 40 microns or less.

In another embodiment, the particle size of at least 80% of the polyhydric alcohol particles is 40 microns or less.

In another embodiment, the thermoplastic composition further comprises a copper based heat stabilizer, wherein the thermoplastic composition has greater than 25 ppm copper.

In another embodiment, the polyhydric alcohol is present in an amount between 0.1 and 20% by weight of the thermoplastic composition.

In another embodiment, the polyhydric alcohol is selected from a group consisting of monopentaerythritol (MPE), dipentaerythritol (DPE), tripentaerythritol (TPE) or combinations thereof.

In another embodiment, the concentration of the amine end groups (AEG) of the polyamide resin is between about 46 meq/kg and about 54 meq/kg and wherein the thermoplastic composition has a relative viscosity of greater than 45.

In another embodiment, the thermoplastic composition further comprises additives such as lubricants, glass fillers, mineral fillers, impact modifiers, plasticizers, pigments, dyes, antioxidants, heat stabilizers, hydrolysis stabilizers, nucleating agents, flame retardants, synergists, drip suppressants, blowing agents and combinations thereof.

In another embodiment, the glass fillers are selected from the group consisting of glass fibers, glass flakes, glass beads and combinations thereof.

In another embodiment, the glass fillers are hydrolysis resistant glass fibers coated with a sizing composition and organosilane coupling agents.

In another embodiment, the mineral fillers are selected from the group consisting of kaolin, clay, talc, and wollastonite, diatomite, titanium dioxide, mica, amorphous silica and combinations thereof.

In another embodiment, the impact modifier comprises an elastomeric polyolefinic polymer functionalized with an unsaturated carboxylic anhydride.

In another embodiment, the impact modifier comprises a maleic anhydride functionalized elastomeric ethylene copolymer, a maleic anhydride functionalized elastomeric ethylene/propylene copolymer, a terpolymer of ethylene, acrylic ester and maleic anhydride, a maleic anhydride grafted (MAH) polyolefin elastomer or combinations thereof.

In another embodiment, the lubricant is selected from a group consisting of a metal stearate, ethylene bis-stearamide and combinations thereof.

In another embodiment, the flame retardant is selected from a group consisting of melamine cyanurate, brominated polystyrene, a metal phosphinate salt, melamine polyphosphate and combinations thereof.

In another embodiment, the synergist is selected from a group consisting of antimony trioxide, zinc borate, dipentaerythritol and combinations thereof.

In another embodiment, the drip suppressant is polytetrafluoroethylene.

In another embodiment, after 1000 hours of hot air testing at 210° C., the thermoplastic composition is capable of retaining greater than 65% of its tensile strength and greater than 50% of its elongation and impact resistance.

In another embodiment, after 1000 hours of hot air testing at 210° C., the thermoplastic composition is capable of retaining greater than 90% of its tensile strength and greater than 65% of its elongation and impact resistance.

In another embodiment, the polyamide is selected from a group consisting of Nylon 6, Nylon 6,6, Nylon 6,12, Nylon 4,6, Nylon 6,10, Nylon 7, Nylon 10, Nylon 10, 10, Nylon 12, Nylon 12, 12, Nylon 6T, Nylon 6T/6I, Nylon 6T/DT, Nylon MXD-6 and combinations thereof.

In another embodiment, the polyamide is Nylon 6,6.

Another embodiment of the current invention comprises an ethylene glycol resistant thermoplastic article comprising the thermoplastic composition described above.

Another embodiment of the current invention comprises a molded or extruded thermoplastic article comprising the thermoplastic composition described above.

Another embodiment of the current invention comprises a molded or extruded thermoplastic article comprising the thermoplastic composition described above for use in exhaust gas recovery systems.

Another embodiment of the current invention comprises a method for improving the Relative Thermal Index of a polyamide composition comprising adding at least one polyhydric alcohol to a polyamide composition.

Another embodiment of the current invention comprises a flame retardant thermoplastic composition comprising:
 a) a polyamide resin;
 b) a polyhydric alcohol, wherein a majority of the polyhydric alcohol particles have a particle size of 70 microns or less; and
 c) a flame retardant component comprising melamine cyanurate.

In another embodiment, the particle size of at least 80% of the polyhydric alcohol particles is 70 microns or less.

In another embodiment, the polyhydric alcohol is selected from a group consisting of monopentaerythritol (MPE), dipentaerythritol (DPE), tripentaerythritol (TPE) or combinations thereof.

In another embodiment, the flame retardant component is present in an amount less than 7% by weight and the composition has a UL-94 rating of V-0.

In another embodiment, the polyamide is selected from a group consisting of Nylon 6, Nylon 6,6, Nylon 6,12, Nylon 4,6, Nylon 6,10, Nylon 7, Nylon 10, Nylon 10, 10, Nylon 12, Nylon 12, 12, Nylon 6T, Nylon 6T/6I, Nylon 6T/DT, Nylon MXD-6 and combinations thereof.

Another embodiment of the current invention comprises a flame retardant thermoplastic composition comprising:
 a) a polyamide resin;
 b) a polyhydric alcohol, wherein a majority of the polyhydric alcohol particles have a particle size of 70 microns or less;
 c) a flame retardant component comprising brominated polystyrene;
 d) glass fiber;
 e) a synergist selected from antimony trioxide and zinc borate; and
 f) polytetrafluoroethylene.

In another embodiment, the particle size of at least 80% of the polyhydric alcohol particles is 70 microns or less.

In another embodiment, the polyhydric alcohol is selected from a group consisting of monopentaerythritol (MPE), dipentaerythritol (DPE), tripentaerythritol (TPE) or combinations thereof.

In another embodiment, the flame retardant thermoplastic composition contains 25% by weight or less of the flame retardant component and the composition has a UL-94 rating of V-0.

In another embodiment, the polyamide is selected from a group consisting of Nylon 6, Nylon 6,6, Nylon 6,12, Nylon 4,6, Nylon 6,10, Nylon 7, Nylon 10, Nylon 10, 10, Nylon 12, Nylon 12, 12, Nylon 6T, Nylon 6T/6I, Nylon 6T/DT, Nylon MXD-6 and combinations thereof.

Another embodiment of the current invention comprises a method for reducing the content of a flame retardant component in a primary polyamide formulation comprising the steps of adding at least one polyhydric alcohol to the polyamide formulation and decreasing the amount of the flame retardant component utilized in the formulation, wherein the resulting formulation exhibits the same or greater flame retardant characteristics as the primary polyamide formulation.

Another embodiment of the current invention comprises a method of decreasing the cycle time and injection pressure required to produce injection molded nylon parts comprising:
 a) providing a nylon composition capable of being injection molded; and
 b) adding a polyhydric alcohol into the nylon composition, wherein a majority of the polyhydric alcohol particles have a particle size of 70 microns or less.

In another embodiment, the particle size of at least 80% of the polyhydric alcohol particles is 70 microns or less.

Another embodiment of the current invention comprises an ethylene glycol resistant thermoplastic article comprising the thermoplastic composition described above.

Another embodiment of the current invention comprises a molded or extruded thermoplastic article comprising the thermoplastic composition described above.

Another embodiment of the current invention comprises a polyamide alloy composition exhibiting hydrolysis resistance comprising:
 a) a nylon 6,6 polyamide resin;
 b) a polyhydric alcohol; and
 c) a functionalized polymer capable of reacting with a polyamide.

In another embodiment, the functionalized polymer is polyphenylene ether.

In another embodiment, the concentration of the amine end groups (AEG) of the nylon 6,6 polyamide resin is greater than 45 meq/kg.

In another embodiment, the polyhydric alcohol is selected from a group consisting of monopentaerythritol (MPE), dipentaerythritol (DPE), tripentaerythritol (TPE) or combinations thereof.

In another embodiment, a majority of the polyhydric alcohol particles have a particle size of 70 microns or less.

In another embodiment, the particle size of at least 80% of the polyhydric alcohol particles is 70 microns or less.

In another embodiment, a majority of the polyhydric alcohol particles have a particle size of 40 microns or less.

In another embodiment, the particle size of at least 80% of the polyhydric alcohol particles is 40 microns or less.

In another embodiment, the polyamide alloy composition further comprises additives such as lubricants, glass fillers, mineral fillers, impact modifiers, plasticizers, pigments, dyes, antioxidants, heat stabilizers, hydrolysis stabilizers, nucleating agents, flame retardants, blowing agents and combinations thereof.

In another embodiment, the glass fillers are selected from the group consisting of glass fiber, glass flakes, glass beads and combinations thereof.

In another embodiment, the mineral fillers are selected from the group consisting of kaolin, clay, talc, and wollastonite, diatomite, titanium dioxide, mica, amorphous silica and combinations thereof.

In another embodiment, the impact modifier comprises an elastomeric polyolefinic polymer functionalized with an unsaturated carboxylic anhydride.

In another embodiment, the impact modifier comprises a maleic anhydride functionalized elastomeric ethylene copolymer, a maleic anhydride functionalized elastomeric ethylene/propylene copolymer, a terpolymer of ethylene, acrylic ester and maleic anhydride, a maleic anhydride grafted (MAH) polyolefin elastomer or combinations thereof.

Another embodiment of the current invention comprises a masterbatch composition comprising a plurality of granules of a particulate polyamide combined with a polyhydric alcohol, wherein a majority of the polyhydric alcohol particles have a particle size of 70 microns or less.

In another embodiment, the particle size of at least 80% of the polyhydric alcohol particles is 70 microns or less.

In another embodiment, a majority of the polyhydric alcohol particles have a particle size of 40 microns or less.

In another embodiment, the particle size of at least 80% of the polyhydric alcohol particles is 40 microns or less.

In another embodiment, masterbatch further comprises a binder.

In another embodiment, masterbatch further comprises additives such as lubricants, flame retardants, tougheners, nucleating agents, mineral fillers, colorants, plasticizers, blowing agents and combinations thereof.

In another embodiment, the polyhydric alcohol is present in an amount between 5 and 75% by weight.

In another embodiment, the polyhydric alcohol is present in an amount between 15 and 25% by weight.

In another embodiment, the polyhydric alcohol is selected from the group consisting of monopentaerythritol (MPE), dipentaerythritol (DPE), tripentaerythritol (TPE) and combinations thereof.

In another embodiment, the polyamide is selected from a group consisting of Nylon 6, Nylon 6,6, Nylon 6,12, Nylon 4,6, Nylon 6,10, Nylon 7, Nylon 10, Nylon 10, 10, Nylon 12, Nylon 12, 12, Nylon 6T, Nylon 6T/6I, Nylon 6T/DT, Nylon MXD-6 and combinations thereof.

In another embodiment, the polyamide is Nylon 6,6.

Another embodiment of the current invention comprises a process for molding a shaped article wherein the masterbatch composition described above is intimately admixed with a granular polyamide resin to form a compounded thermoplastic composition, wherein the polyhydric alcohol present masterbatch composition comprises from about 0.05% to about 20% by weight of the compounded thermoplastic composition and then molding the compounded thermoplastic composition into said shaped article.

In another embodiment, the polyhydric alcohol present in the masterbatch composition comprises from about 0.1% to about 5% by weight of the compounded thermoplastic composition.

In another embodiment, the granular polyamide resin is selected from a group consisting of Nylon 6, Nylon 6,6, Nylon 6,12, Nylon 4,6, Nylon 6,10, Nylon 7, Nylon 10, Nylon 10, 10, Nylon 12, Nylon 12, 12, Nylon 6T, Nylon 6T/6I, Nylon 6T/DT, Nylon MXD-6 and combinations thereof.

In another embodiment, the granular polyamide resin is Nylon 6,6.

In another embodiment, after 1000 hours of hot air testing at 210° C., the compounded thermoplastic composition is capable of retaining greater than 65% of its tensile strength and greater than 50% of its elongation and impact resistance.

In another embodiment, after 1000 hours of hot air testing at 210° C., the compounded thermoplastic composition is capable of retaining greater than 90% of its tensile strength and greater than 65% of its elongation and impact resistance.

DETAILED DESCRIPTION OF THE INVENTION

The present invention relates to a thermoplastic composition that provides improved thermal aging stability along with durability. The thermoplastic composition comprises a polyamide resin, and a polyhydric alcohol, wherein the particle size of the majority of the polyhydric alcohol particles is less than about 70 microns. It has been found that a combination of a polyamide resin and a polyhydric alcohol with this particle size produces a superior product demonstrating greater thermal stability and durability than the polyamide resin alone.

All patents, patent applications, test procedures, priority documents, articles, publications, manuals, and other documents cited herein are fully incorporated by reference to the extent such disclosure is not inconsistent with this invention and for all jurisdictions in which such incorporation is permitted.

The use of polyhydric alcohols as stabilizers to improve physical properties in thermoplastic compositions is well known in the art. EP application 1,041,109 A2, herein incorporated by reference, teaches a polyamide composition comprising a polyamide resin and a polyhydric alcohol to achieve a thermoplastic composition that has both good fluidity and mechanical strength. U.S. Patent Application No. 2010/0029819 A1 teaches a thermoplastic article having high heat stability that includes one or more polyhydric alcohols. The previously disclosed examples of this application teach the use of a polyhydric alcohol additive wherein greater than 50% of the polyhydric alcohol particles have a particle size between 200 and 500 microns. The present invention is based on the unexpected and novel finding that the particle size of the polyhydric alcohol added to a polymer resin has a significant impact on the heat aging characteristics of the final thermoplastic composition. The applicants have discovered that the use of polyhydric alcohols wherein the majority of the polyhydric alcohol particles have a particle sizes less than 70 microns allows for significant retention of physical properties after even extensive heat aging.

Figure 1:
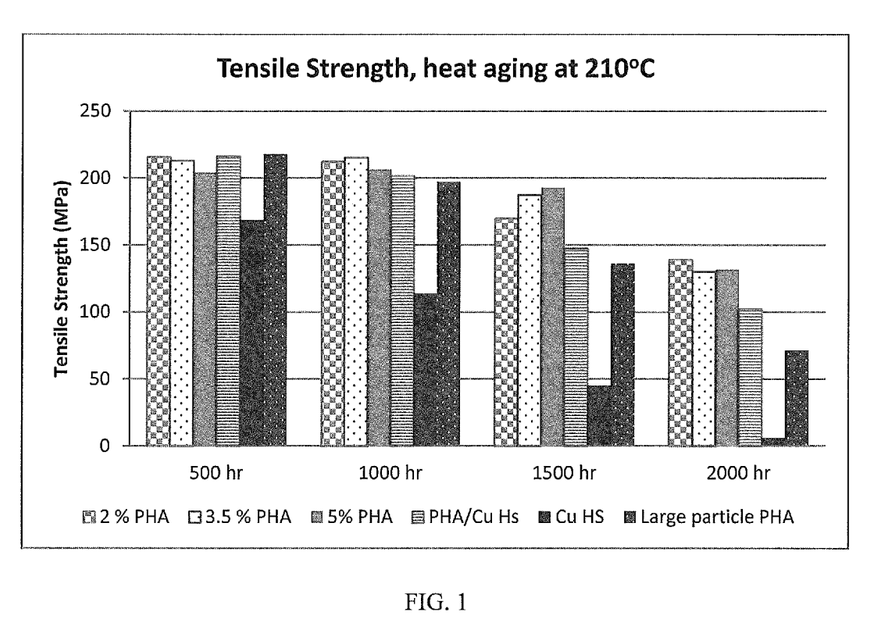
FIG. 1 is a chart summarizing the tensile strength of compositions with various heat stabilizing components after different stages of hot air aging.
Figure 2:
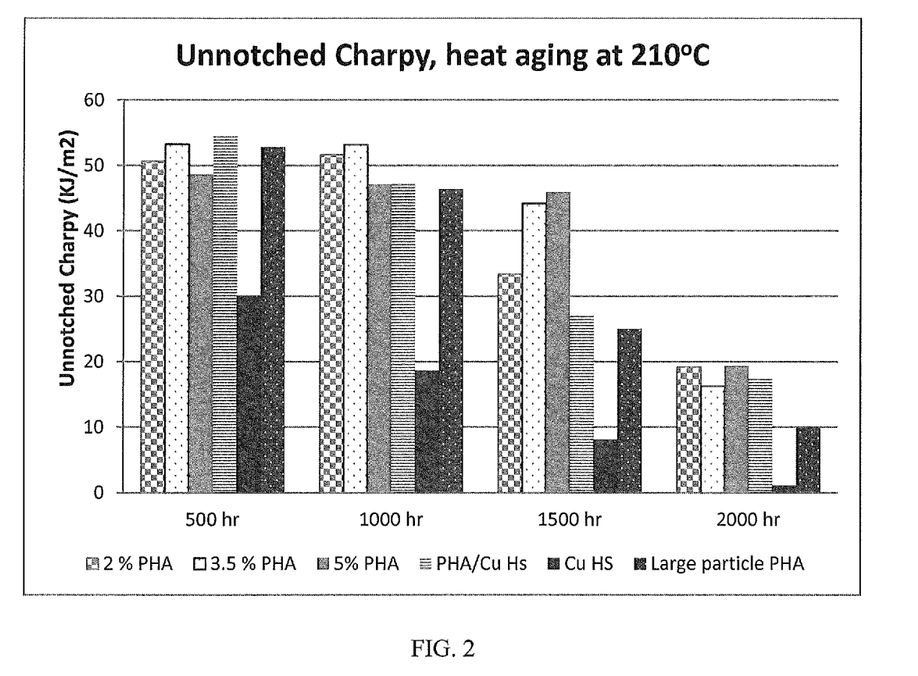
FIG. 2 is a chart summarizing the unnotched charpy of compositions with various heat stabilizing components after different stages of hot air aging.
Figure 3:
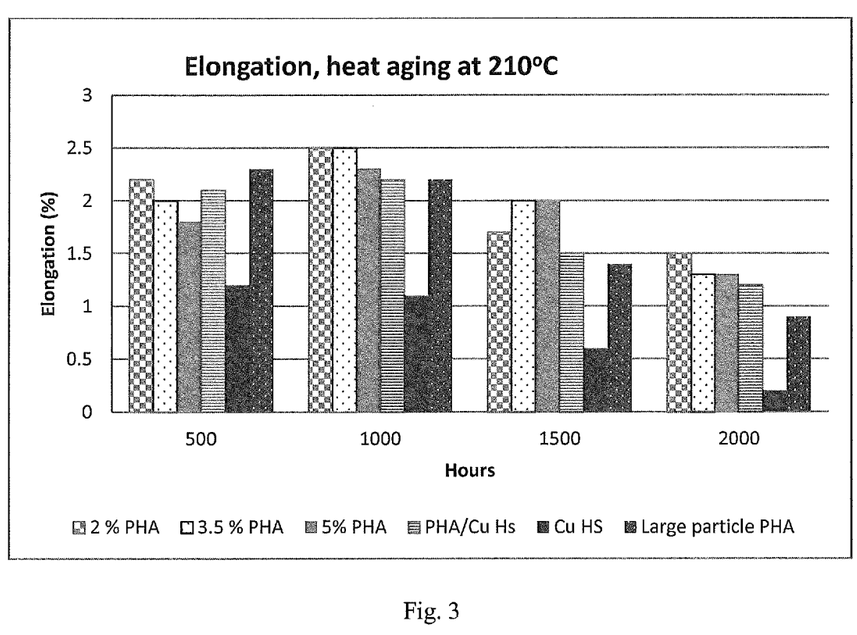
FIG. 3 is a chart summarizing the elongation of compositions with various heat stabilizing components after different stages of hot air aging.
Figure 4:
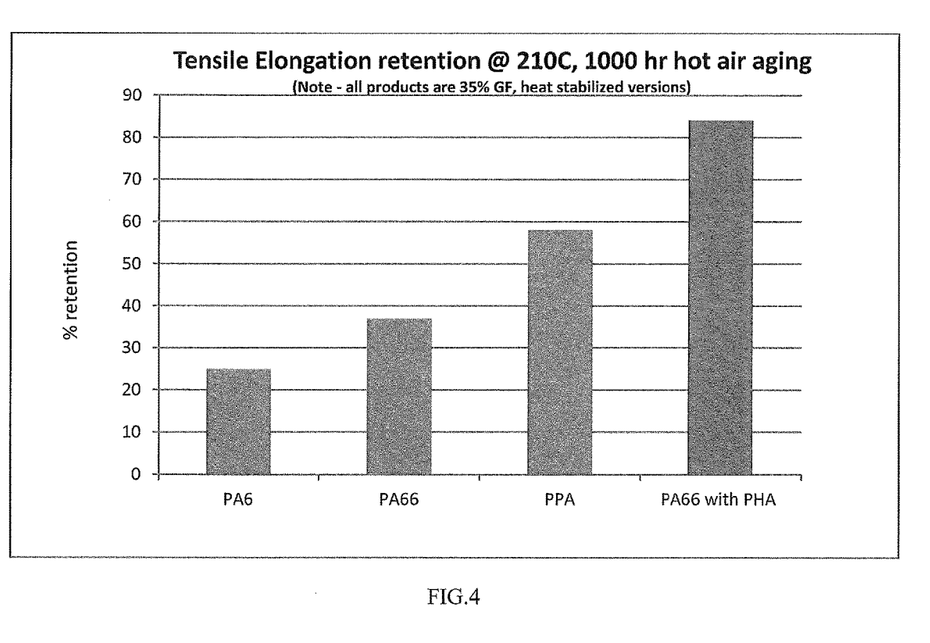
FIG. 4 is a chart summarizing the tensile elongation retention of various polymers after 1000 hours of heat aging.
Figure 5:
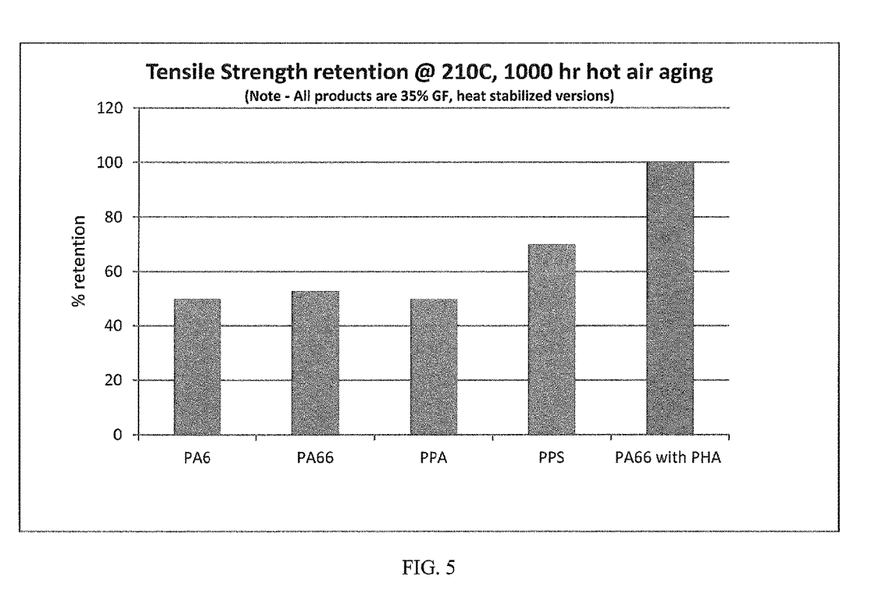
FIG. 5 is a chart summarizing the tensile strength retention of various polymers after 1000 hours of heat aging.
Figure 6:
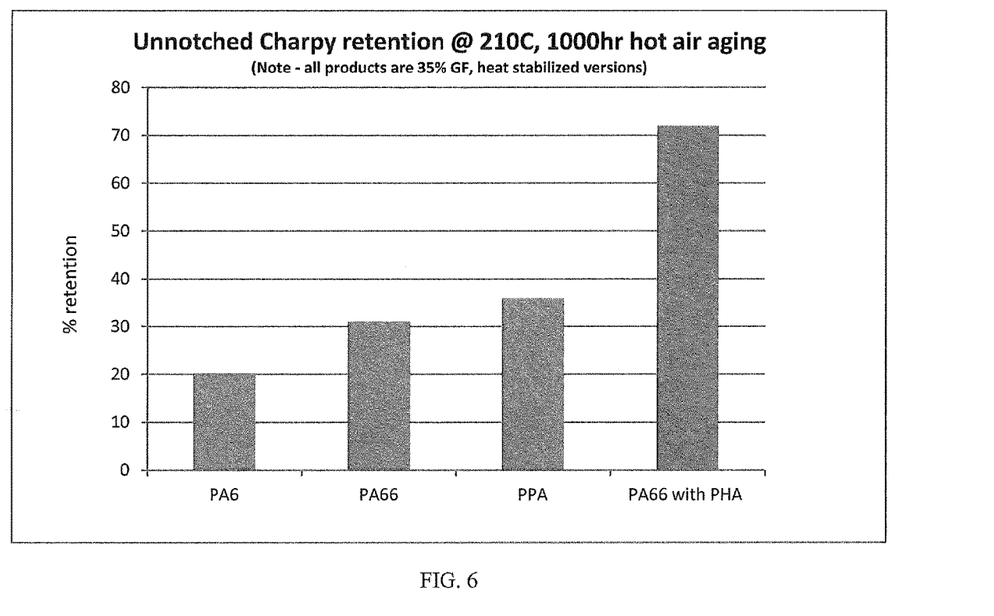
FIG. 6 is a chart summarizing the unnotched charpy retention of various polymers after 1000 hours of heat aging.

Accordingly, the current invention teaches thermoplastic compositions comprising a polyamide resin and a polyhydric alcohol, wherein the particle size of the majority of the polyhydric alcohol particles is less than 70 microns. In another embodiment of the current invention, greater than 80% of the polyhydric alcohol particles have a particle size less than 70 microns. In another embodiment of the current invention, the particle size of the majority of the polyhydric alcohol particles is less than 40 microns. In another embodiment of the current invention, greater than 80% of the polyhydric alcohol particles have a particle size less than 40 microns. A copper based stabilizer may also be present in levels greater than 25 ppm of copper. FIGS. 1-3 show the significant improvement in retention of tensile strength, elongation and unnotched charpy of the current invention over thermoplastic compositions with polyhydric alcohols (PHA) with particles sizes greater than 70 microns (large particle PHA) and also thermoplastic compositions using copper based stabilizers. As shown in FIG. 4, the Tensile Strength of polyamide and polyhydric alcohol composition of the current invention were superior to the polyamide and copper based heat stabilizer composition during aging studies at 1000 hours and 210° C. Similarly, as shown in FIGS. 4-6 the polyamide and polyhydric alcohol compositions of the current invention performed better than the polyamide and copper based heat stabilizer compositions at 1000 hours and 210° C. for unnotched charpy (impact resistance), tensile strength and tensile elongation.

Polyhydric alcohols that may be used in the current invention include only the polyol, pentaerythritol including monopentaerythritol (MPE); dipentaerythritol (DPE) and tripentaerythritol (TPE) or combinations thereof. Polyhydric alcohols of this invention do not include ethylene glycols, propylene glycols, glycerins, butanediols, diglycols, or polyethylene glycols. In one embodiment of the current invention, the polyhydric alcohol may be present in an amount between 0.1 and 20% by weight of the thermoplastic composition. In another embodiment of the current invention, the polyhydric alcohol may be present in an amount between 0.1 and 5% by weight of the thermoplastic composition.

Suitable polyamide resins that may be used for the current invention include any known polyamides in the art. These include aliphatic, semicrystalline, aromatic or semiaromatic nylon resins. The nylon resins are those prepared from starting materials of essentially a lactam or a diamine, and an aliphatic, semiaromatic or aromatic dicarboxylic acid. Suitable lactams include caprolactam and laurolactam. Suitable amines include tetramethylenediamine, hexamethylenediamine (HMD), 2-methylpentamethylenediamine, undecamethylenediamine, dodecamethylenediamine, 2,2,4-/2,4,4-trimethylhexamethylenediamine, 5-methylnonamethylenediamine, metaxylylenediamine (MXD) and paraxylylenediamine. Suitable dicarboxylic acids such include adipic acid, suberic acid, azelaic acid, sebacic acid, dodecanedioic acid (DDDA), terephthalic acid (TPA), isophthalic acid (IPA), 2-chloroterephthalic acid, 2-methylterephthalic acid, 5-methylisophthalic acid, 5-sodium-sulfoisophthalic acid, hexahydroterephthalic acid and hexahydroisophthalic acid. In the invention, nylon homopolymers or copolymers to be derived from those starting materials are used either singly or as their mixtures.

Specific examples of polyamide resins that are suitable for the current invention are polycapramide (nylon 6), polyundecanamide (nylon 11), polylauramide (nylon 12), polyhexamethyleneadipamide (nylon 66), polytetramethyleneadipamide (nylon 46), polyhexamethylenesebacamide (nylon 610), polyhexamethylenedodecamide (nylon 612), polyhexamethyleneterephthalamide/polycapramide copolymer (nylon 6T/6), polyhexamethyleneterephthalamide/polydodecanamide copolymer (nylon 6T/12), polyhexamethylenadipamide/polyhexamethyleneterephthalamide copolymer (nylon 66/6T), polyhexamethylenadipamide/polyhexamethylenisophthalamide copolymer (nylon 66/6I), polyhexamethylenadipamide/polyhexamethylenisophthalamide/-polycapramide copolymer (nylon 66/6I/6), polyhexamethylenadipamide/polyhexamethyleneterephthalamide/polyhexamethylenisophthalamide copolymer (nylon 66/6T/6I), polyhexamethyleneterephthalamide/-polyhexamethylenisophthalamide copolymer (nylon 6T/6I), polyhexamethyleneterephthalamide/poly(2-methylpentamethylene)terephthalamide copolymer (nylon 6T/M5T), polyhexamethyleneterephthalamide/-polyhexamethylenesebacamide/polycapramide copolymer (nylon 6T/610/6), polyhexamethyleneterephthalamide/polydodecanamide/-polyhexamethylenadipamide copolymer (nylon 6T/12/66), polyhexamethyleneterephthalamide/polydodecanamide/-polyhexamethylenisophthalamide copolymer (nylon 6T/12/6I), poly m-xylylenadipamide (nylon MXD6), as well as their mixtures and copolymers, etc.

Nylon resins suitable for the current invention are Nylon 6, Nylon 6,6, Nylon 6,12, Nylon 4,6, Nylon 6,10, Nylon 7, Nylon 10, Nylon 10, 10, Nylon 12, Nylon 12, 12, Nylon 6T, Nylon 6T/6I, Nylon 6T/DT, Nylon MXD-6 and combinations or copolymers thereof. In another exemplary embodiment of the current invention the polyamide resin is Nylon 6,6.

Figure 10:
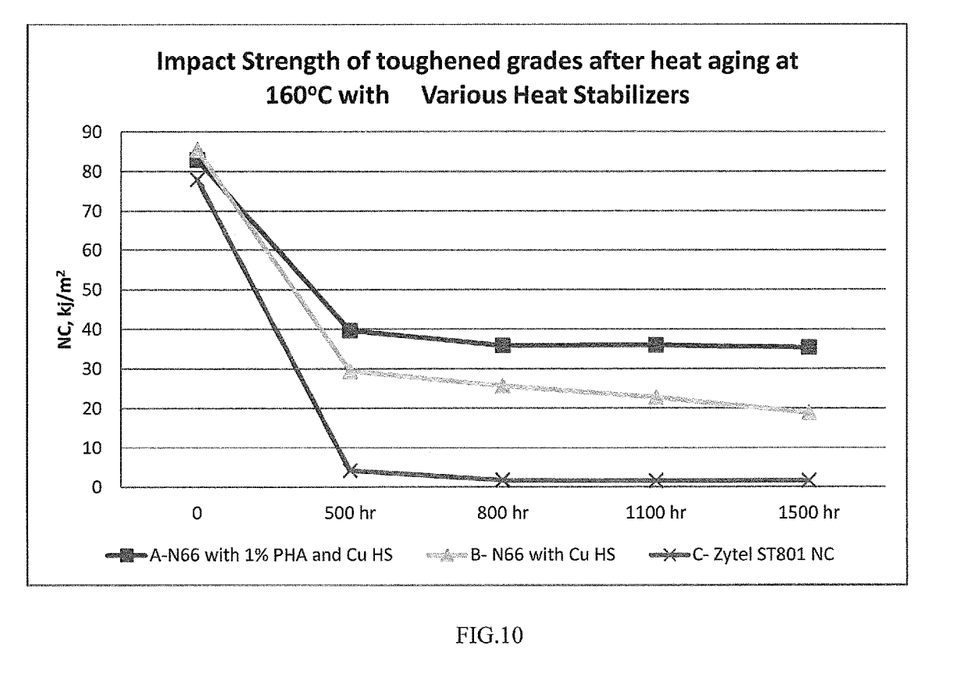
FIG. 10 is a chart summarizing the tensile strength of impact modified compositions with various heat stabilizing components after different stages of hot air aging.

The thermoplastic compositions of the current invention may also comprise an impact modifier. Suitable impact modifiers include those known in the art that impart improved impact strength when combined with polyamide resins. U.S. Pat. Nos. 4,346,194, 6,579,581 and 7,671,127, herein incorporated by reference, teach nylon resins with impact modifying components. In an embodiment of the current invention, the thermoplastic composition comprises a polyamide resin, a polyhydric alcohol wherein the particle size of the majority of the polyhydric alcohol particles is less than about 70 microns and an elastomeric polyolefinic polymer functionalized with an unsaturated carboxylic anhydride. As shown in FIG. 10, this composition retains a higher percentage of impact strength, as indicated by the notched charpy results after 800 hours of heat aging than other resins.

Suitable elastomers are copolymers of ethylene with α-olefins, acrylates or methacrylates. Other suitable polymers are styrenic block copolymers of 1, 3 unsaturated monomers such as butadienes, isoprenes and their hydrogenated analogs. Other elastomers may include terpolymers of ethylene, propylene and a diene (EPDM).

Suitable functional groups include carboxylic acid groups, carboxylic anhydride groups, carboxylic ester groups, carboxamide groups, carboximide groups, amino groups, hydroxy groups, epoxy groups, urethane groups, and oxazoline groups. Examples of suitable monomers for introducing the functional groups are maleic anhydride, itaconic acid, acrylic acid, glycidyl acrylate, and glycidyl methacrylate.

Other suitable impact modifiers include a maleic anhydride functionalized elastomeric ethylene copolymer, a maleic anhydride functionalized elastomeric ethylene/propylene copolymer, a terpolymer of ethylene, acrylic ester and maleic anhydride, a maleic anhydride grafted (MAH) polyolefin elastomer or combinations thereof.

The thermoplastic compositions of the current invention may further comprise additives such as lubricants, glass fillers, mineral fillers, plasticizers, pigments, dyes, antioxidants, heat stabilizers, hydrolysis stabilizers, nucleating agents, flame retardants, synergists, drip suppressants, blowing agents and combinations thereof. Suitable mineral fillers can be selected from the group consisting of kaolin, clay, talc, and wollastonite, diatomite, titanium dioxide, mica, amorphous silica and combinations thereof. The lubricant may be a metal stearate, ethylene bis-stearamide or any other suitable lubricant. Suitable glass fillers are selected from the group consisting of glass fiber, glass flakes, glass beads and combinations thereof. The glass fibers may also be coated with a sizing composition and organosilane coupling agents to provide hydrolysis resistance. Suitable coated glass fibers are taught in U.S. Pat. Nos. 6,207,737, 6,846,855, 7,419,721 and 7,732,047, which are herein incorporated by reference. Suitable heat stabilizers are selected from the group consisting of hindered phenols, amine antioxidants, hindered amine light stabilizers (HALS), aryl amines, phosphorus based antioxidants, copper heat stabilizers, polyhydric alcohols, tripentaerythritol, dipentaerythritol, pentaerythritol and combinations thereof.

In another embodiment of the current invention, a thermoplastic composition of claim includes a flame retardant. In another embodiment, thermoplastic composition may also include a synergist and drip suppressant. Suitable flame retardants include melamine cyanurate, brominated polystyrene, a metal phosphinate salt, melamine polyphosphate and combinations thereof. Suitable synergists include antimony trioxide, zinc borate, polyhydric alcohols and combinations thereof. One suitable drip suppressant is polytetrafluoroethylene. Embodiments of the current invention have been shown to exhibit a flammability class rating according to Underwriters Laboratory Inc. UL-94 of V-0. Additionally, flame retardant embodiments of the current invention have been shown to exhibit a glow wire ignition temperature of greater than 750° C. using standard test method IEC60695-2-13 at a specimen thickness of 1.6 mm.

It has been found that the addition of a polyhydric alcohol, wherein the particle size of the majority of the polyhydric alcohol particles is less than about 70 microns, to a flame retardant composition provides significant advantages to typical flame retardant compositions. The addition of the polyhydric alcohol lowers the viscosity and improves the melt flow of the flame retardant composition. In addition, by adding a polyhydric alcohol, the amount of flame retardants needed is reduced.

Accordingly, another embodiment of the current invention comprises a method for reducing the content of a flame retardant component in a primary polyamide formulation comprising the steps of adding at least one polyhydric alcohol to the polyamide formulation and decreasing the amount of the flame retardant component utilized in the formulation, wherein the resulting formulation exhibits the same or greater flame retardant characteristics as the primary polyamide formulation.

Another embodiment of the current invention comprises a flame retardant thermoplastic composition comprising a polyamide resin, a polyhydric alcohol, wherein a majority of the polyhydric alcohol particles have a particle size of 70 microns or less and a flame retardant component comprising melamine cyanurate. In another embodiment of the current invention, greater than 80% of the polyhydric alcohol particles have a particle size less than 70 microns. In another embodiment of the current invention, the particle size of the majority of the polyhydric alcohol particles is less than 40 microns. In another embodiment of the current invention, greater than 80% of the polyhydric alcohol particles have a particle size less than 40 microns. A copper based stabilizer may also be present in levels greater than 25 ppm of copper. The polyhydric alcohol is selected from a group consisting of monopentaerythritol (MPE), dipentaerythritol (DPE), tripentaerythritol (TPE) or combinations thereof. The polyamide resin may be selected from the polyamides enumerated above. Table 1 compares the UL-94 rating of this composition to a typical flame retardant composition using a copper based heat stabilizer. As shown in Table 1, the composition of the current invention has a UL-94 rating of V-0 (Vertical Flame Test), while having less than 7% by weight of a flame retardant component.

TABLE 1

|  | 1 | 2 | 3 | 4 |
| --- | --- | --- | --- | --- |
| PA66 (%) | 94.5 | 92.5 | 92.8 | 90.8 |
| Melamine Cyanurate (%) | 5 | 7 | 5 | 7 |
| Polyhydric Alcohol (%) | 0 | 0 | 2 | 2 |
| Zinc Stearate (%) | 0.2 | 0.2 | 0.2 | 0.2 |
| Cu based Heat Stabilizer (%) | 0.3 | 0.3 | 0 | 0 |
| UL-94 Rating | V-2 | V-0 | V-0 | V-0 |

Another embodiment of the current invention comprises a flame retardant thermoplastic composition comprising A flame retardant thermoplastic composition comprising a polyamide resin, a polyhydric alcohol, wherein a majority of the polyhydric alcohol particles have a particle size of 70 microns or less, a flame retardant component comprising brominated polystyrene, glass fiber, a synergist selected from antimony trioxide and zinc borate and polytetrafluoroethylene. In another embodiment of the current invention, greater than 80% of the polyhydric alcohol particles have a particle size less than 70 microns. In another embodiment of the current invention, the particle size of the majority of the polyhydric alcohol particles is less than 40 microns. In another embodiment of the current invention, greater than 80% of the polyhydric alcohol particles have a particle size less than 40 microns. A copper based stabilizer may also be present in levels greater than 25 ppm of copper. The polyhydric alcohol is selected from a group consisting of monopentaerythritol (MPE), dipentaerythritol (DPE), tripentaerythritol (TPE) or combinations thereof. The polyamide resin may be selected from the polyamides enumerated above. Table 2 compares the UL-94 rating of this composition to a typical flame retardant composition using a copper based heat stabilizer. As shown in Table 2, the composition of the current invention has a UL-94 rating of V-0 (Vertical Flame Test), while having 25% by weight or less of the flame retardant component.

TABLE 2

|  | 1 | 2 |
|---|---|---|
| PA66 (%) | 63.1 | 61.4 |
| Glass Fiber (%) | 25 | 25 |
| Brominated FR (%) | 25 | 25 |
| Polyhydric Alcohol (%) | 0 | 2 |
| Synergist (%) | 11.4 | 11.4 |
| Zinc Stearate (%) | 0.2 | 0.2 |
| Cu based Heat Stabilizer (%) | 0.3 | 0 |
| UL-94 Rating | V-2 | V-0 |

The thermoplastic compositions of the current invention may be formed into a variety of articles including but not limited to automotive parts, pipes, ties and electronic parts. The compositions may be also be utilized in exhaust gas recovery (EGR) applications. As described in Example 10, laboratory testing showed that samples of the current invention were found to perform well when subjected to EGR test conditions.

In another embodiment, the thermoplastic composition comprises a polyamide resin; and at least one polyhydric alcohol wherein the concentration of the amine end groups (AEG) of the polyamide is between 46 meq/kg and 54 meq/kg, and the polyamide resin has a relative viscosity of greater than 45. The relative viscosity is measured on a 8.4 wt % nylon-6,6 polymer solution in 90 wt % formic acid. The thermoplastic composition may further comprise glass fiber, mineral filler, an impact modifier or other additives if desired.

In one aspect, the polyamide alloy composition may further exhibit hydrolysis resistance, when it is comprised of a nylon 66 polyamide resin; at least one polyhydric alcohol, and a functionalized polymer capable of reacting with a polyamide. The functionalized polymer may be a polyphenylene ether. In another aspect, the hydrolysis resistant composition comprises a polyamide having a relative viscosity of greater than 45 and at least one functionalized polymer and at least one polyhydric alcohol.

In another embodiment, a masterbatch composition comprising a plurality of granules of a particulate polyamide combined with a polyhydric alcohol is provided, wherein a majority of the polyhydric alcohol particles have a particle size of 70 microns or less. The term "Combined" is meant to include "compounded with", dry pressed out with another powder, intermingled, or otherwise mixed together. In another embodiment of the masterbatch composition, greater than 80% of the polyhydric alcohol particles have a particle size less than 70 microns. In another embodiment of the masterbatch composition, the particle size of the majority of the polyhydric alcohol particles is less than 40 microns. In another embodiment of the masterbatch composition, greater than 80% of the polyhydric alcohol particles have a particle size less than 40 microns. The masterbatch may further comprise a binder, lubricant, colorant, fillers, flame retardant component, or other additives. In one embodiment, the polyhydric alcohol may be present in the masterbatch in an amount from about 5% to about 75% by weight. In another embodiment, the polyhydric alcohol may be present in the masterbatch in an amount from about 15% to about 25% by weight. The polyamide used in the masterbatch may be selected from the list enumerated above. In one embodiment, the polyamide used in the masterbatch is nylon 6,6.

Another embodiment of the current invention comprises a process for molding a shaped article formed from a polyamide and the masterbatch composition described above. The process comprises the steps of intimately admixing or combining a granular polyamide resin with the masterbatch composition to form a compounded thermoplastic composition, wherein the masterbatch composition comprises from about 0.05% to about 20% by weight of the compounded thermoplastic composition and then molding the compounded thermoplastic composition into a shaped article. In another embodiment, the polyhydric alcohol present in the masterbatch composition may comprise from about 0.1% to about 5% by weight of the compounded thermoplastic composition. The granular polyamide used in the process may be selected from the list enumerated above. In one embodiment, the polyamide used in the masterbatch is nylon 6,6. The compounded thermoplastic composition produced by the process may be used to make shaped articles via injection molding, or cast setting.

Another embodiment of the current invention comprises a method of decreasing the cycle time and injection pressure required to produce injection molded nylon parts comprising the step of adding a polyhydric alcohol having a particle size of less than 70 microns and preferably less than 40 microns. It has been found that compositions of the current invention improve the surface appearance over typical nylon 6/66 copolymers. The addition of a nylon 6 polymer to a nylon 6,6 polymer normally improves the surface finish appearance and flow performance over homopolymer nylon 6,6. However, the typical advantages of this type of material fell short compared to thermoplastic compositions of the current invention. Peak injection pressure was reduced by about 200 psi hydraulic (~2000 psi plastic pressure). Surface appearance typically presents a challenge when molding glass filled polyamides. The superior flow of the compositions of the current invention yielded some surface finish improvement over typical polymers. It is also very likely that with improved flow, overall process melt temperatures could be reduced. As a result, it is believed that the lower required cooling time and thus shorter overall cycle time would be realized.

Figure 11:
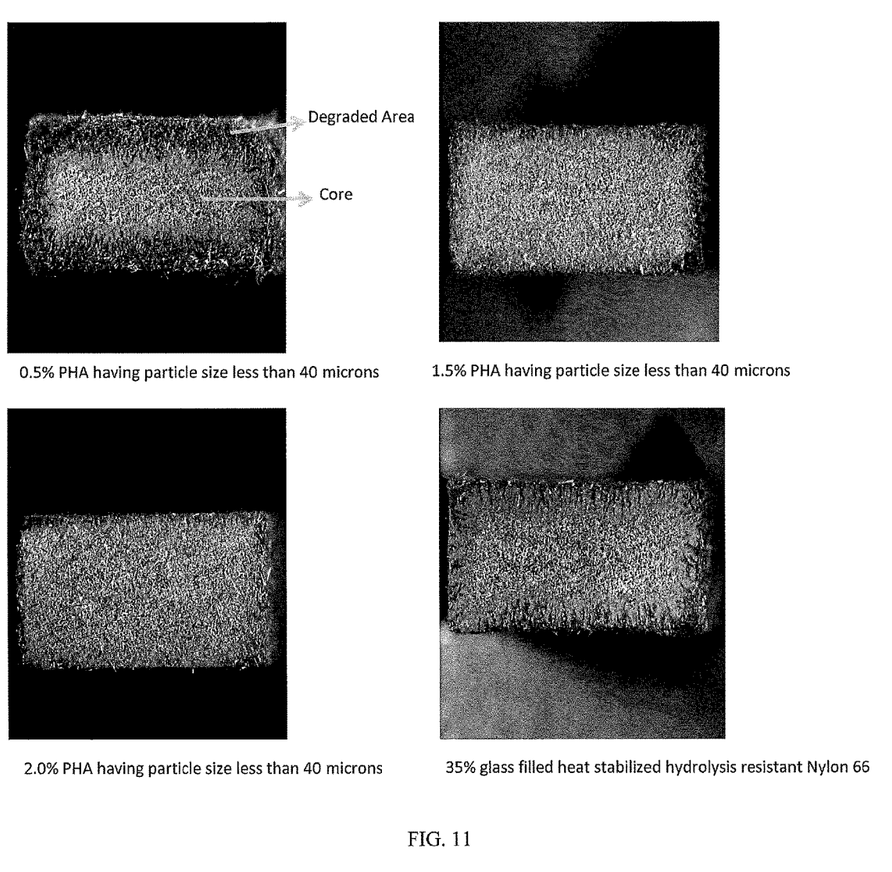
FIG. 11 shows images displaying the surface degradation of thermoplastic compositions with various heat stabilizing components after 2000 hours of heat aging.

Thermoplastic compositions of the current invention have showed a significant improvement in the reduction of degradation. FIG. 11 shows images displaying the degradation of thermoplastic compositions with various heat stabilizing components after 2000 hours of heat aging. As can be seen, thermoplastic compositions of the current invention with 1.5 and 2.0% by weight of polyhydric alcohol show significant reduction in degradation over typical glass filed nylon compositions.

Thermoplastic compositions of the current invention have been found to meet desired heat aging standards. After 1000 hours of hot air testing at 210° C., the compounded polyamide composition is capable of retaining greater than 65% of its tensile strength and greater than 50% of its elongation and impact resistance. In another embodiment, after 1000 hours of hot air testing at 210° C., the thermoplastic composition is capable of retaining greater than 90% of its tensile strength and greater than 65% of its elongation and impact resistance.

EXAMPLES

The following Examples demonstrate the present invention and its capability for use. The invention is capable of other and different embodiments, and its several details are capable of modifications in various apparent respects, without departing from the scope and spirit of the present invention. Accordingly, the Examples are to be regarded as illustrative in nature and non-limiting.

The following examples were performed using nylon 6,6 resin commercially available from INVISTA under the trade name TORZEN™ U4800 NC01. Commercially available polyhydric alcohol (PHA) was used that contains small particle polyhydric alcohol, wherein 80% of the PHA particles have a particle size below 40 microns. For test samples comprising glass fibers, commercially available glass fibers were used, such as CHOPVANTAGE HP 3610 chopped glass fiber available from PPG Fiber Glass. For impact modified test samples, commercially available tougheners were used, such as Exxelor™ VA 1840, sold by ExxonMobil®. Examples of commercially available copper based heat stabilizers include Bruggolen® H320, which is sold by Bruggemann Chemical.

Formulations were prepared by melt blending the ingredients in a 25 mm twin screw extruder. The extruder was maintained at about 280° C. with a screw speed of about 250 rpm, and a throughput of 20 kg/hour. Glass fibers were added to the melt through a screw side feeder and the compounded mixture was extruded in the form of strands, cooled in a water bath, chopped into pellets, dried at 100° C. for 8 hours. Finally, the pellets were stored in sealed aluminum lined bags to prevent the buildup of moisture.

The tensile strength and elongation at break were measured according to ISO 527. The notched charpy and unnotched charpy tests for impact resistance were done according to ISO 179 testing methods. The tests were performed using injection molded ISO tensile bars. The hot air aging tests were performed by according to the ISO 2578 testing method. Samples were heat aged in re-circulating air ovens to simulate aging conditions. At specific intervals of heat aging, the samples were removed from the oven and allowed to cool in a desiccator to room temperature. Finally, the samples were sealed into aluminum lined bags to prevent moisture buildup until being tested.

Example 1

FIG. 1 shows the results of resins with varying amounts of PHA when tested for heat aging at 210° C. For Examples 1-3, the samples use commercially available large particle PHA, with a particle size greater than 180 microns. As can be seen, the compositions of the current invention with between 2 and 5% polyhydric alcohol were able to retain substantially more of its tensile strength than nylon 6,6 compositions with combinations of polyhydric alcohol and copper based stabilizers, copper based stabilizers alone or polyhydric alcohols with larger particle sizes

Example 2

FIG. 2 shows the results of resins with varying amounts of PHA when tested for heat aging at 210° C. As can be seen, the compositions of the current invention with between 2 and 5% polyhydric alcohol were able to retain substantially more their impact strength, as shown by the unnotched charpy results, than nylon 6,6 compositions with combinations of polyhydric alcohol and copper based stabilizers, copper based stabilizers or large particle polyhydric alcohol.

Example 3

FIG. 3 shows the results of resins with varying amounts of PHA when tested for heat aging at 210° C. As can be seen, the compositions of the current invention with between 2 and 5% polyhydric alcohol were able to retain substantially more of its elongation than nylon 6,6 compositions with combinations of polyhydric alcohol and copper based stabilizers, copper based stabilizers or large particle polyhydric alcohol.

Examples 4-6

Examples 4-6 compare the performance of embodiments of the current invention with typically available polymers. Data for 35% glass filled, heat stabilized PA6, PA66, PPA (Polyphthalamide) and PPS (polyphenylene sulfide) was obtained from published reports from E.I. du Pont Nemours and Company (published reports can be found at http://www.campusplastics.com/campus/). Samples utilizing embodiments of the current invention were made using commercially available PA66 from INVISTA under the trade name TORZEN™ U4800 NC01. The polyhydric alcohol (PHA) used commercially available small particle polyhydric alcohol (PHA), wherein 80% of the PHA particles have a particle size below 40 microns. For test samples comprising glass fibers, commercially available glass fibers were used, such as CHOPVANTAGE HP 3610 chopped glass fiber available from PPG Fiber Glass.

Example 4

FIG. 4 shows the results of the various resins when tested after 1000 hours of hot air aging at 210° C. As can be seen, the 35% glass filled nylon 6,6 product which comprises a small particle polyhydric alcohol (80% of the PHA particles have a particle size below 40 microns) heat stabilizer was able to retain substantially more of its tensile elongation.

Example 5

FIG. 5 shows the results of the various resins when tested after 1000 hours of hot air aging at 210° C. As can be seen, the 35% glass filled nylon 6,6 product which comprises a small particle polyhydric alcohol heat stabilizer (80% of the PHA particles have a particle size below 40 microns) was able to retain substantially more of its tensile strength.

Example 6

FIG. 6 shows the unnotched charpy results of the resins when tested for impact resistance during 1000 hours of hot air aging at 210° C. As can be seen, the 35% glass filled nylon 6,6 product which comprises a small particle polyhydric alcohol heat stabilizer (80% of the PHA particles have a particle size below 40 microns) performed substantially better in unnotched charpy, or impact resistance, retention.

Example 7

Figure 7:
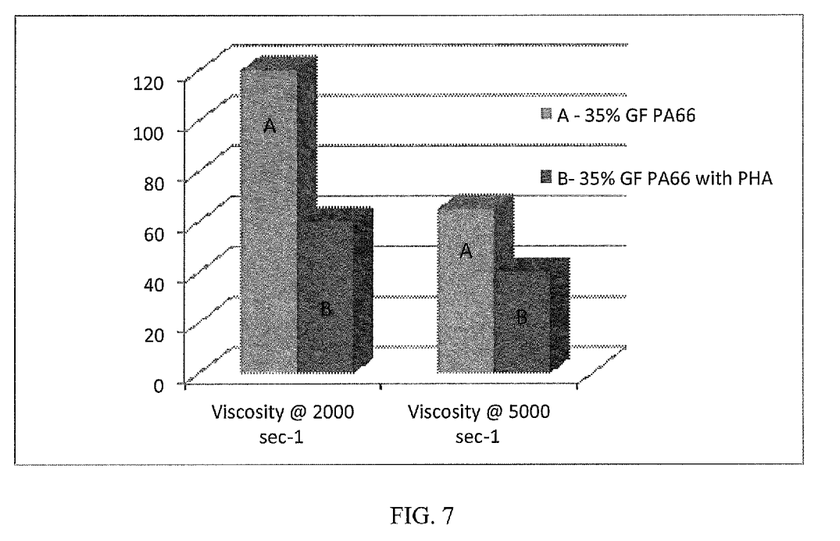
FIG. 7 is a chart comparing the viscosity of the composition of the current invention and typical heat stabilized compositions at various shear rates.

Example 7 compares the viscosity of samples of nylon 6,6 resin commercially available from INVISTA under the trade name TORZEN™ U4800 NC01 with and without polyhydric alcohol added. Both samples contained 35% by weight of glass fibers. Sample A uses a commercially available copper based heat stabilizer, such as Bruggolen® H320 sold by Bruggemann Chemical. Sample B contains a small particle polyhydric alcohol, wherein 80% of the PHA particles have a particle size below 40 microns. As shown in FIG. 7, Sample B exhibits 40-50% higher flow than Sample A.

Example 8

Figure 8:
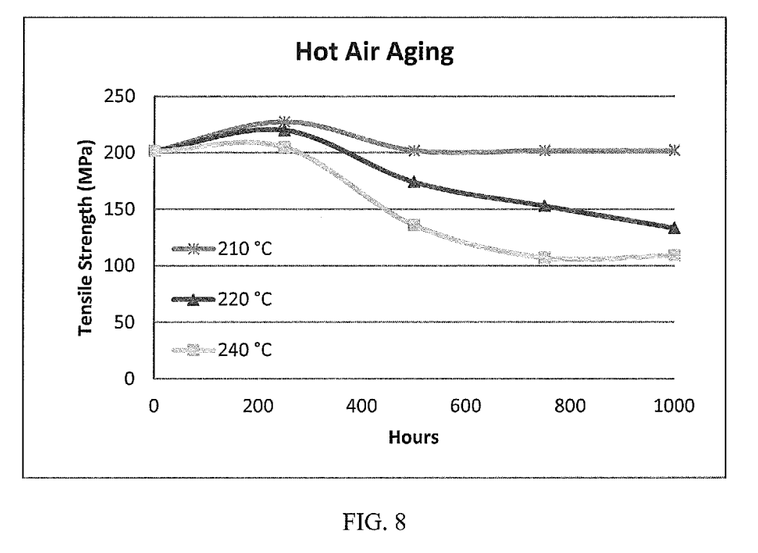
FIG. 8 is a chart summarizing the tensile strength retention of a composition of the current invention at various stages of hot air aging.
Figure 9:
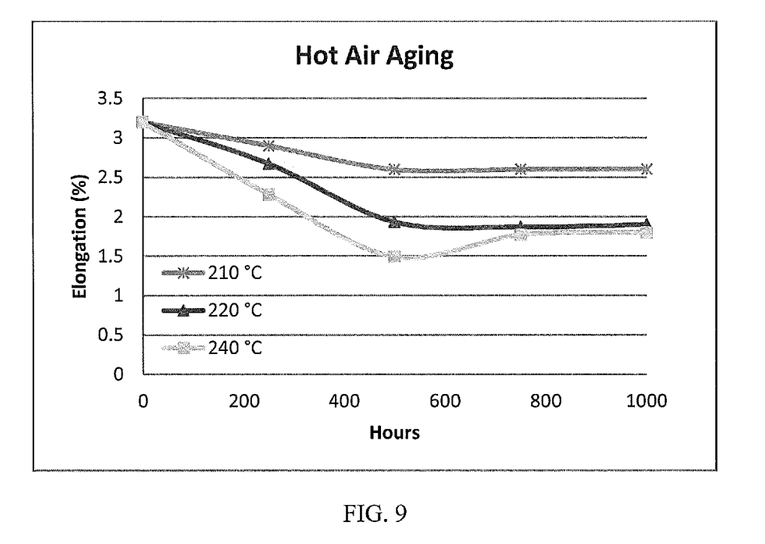
FIG. 9 is a chart summarizing the tensile elongation retention of a composition of the current invention at various stages of hot air aging.

Example 8 displays the results of hot air aging of embodiments of the current invention. Samples were made using nylon 6,6 resin commercially available from INVISTA under the trade name TORZEN™ U4800 NC01. The samples were also 35% glass filled and contained 2% by weight of small particle polyhydric alcohol (80% of the PHA particles have a particle size below 40 microns). As shown in FIGS. 8 and 9, the samples retained at least 50% tensile strength and tensile elongation even at 240° C. at up to 1000 hours of hot air aging.

Example 9

Example 9 compares the notched charpy results after hot air aging at 160° C. of impact modified nylon resins. Sample A and B contain a nylon 6,6 base resin commercially available from INVISTA under the trade name TORZEN™ U4800 NC01 and 22% by weight of a commercially available toughener, such as Exxelor™ VA 1840 sold by ExxonMobil®. Sample A contains both a copper based heat stabilizer and a small particle polyhydric alcohol (80% of the PHA particles have a particle size below 40 microns. Sample B contains only a copper based heat stabilizer. Sample C is an impact modified, 35% glass filled grade with a copper based stabilizer, commercially available under the name Zytel ST801 NC and sold by E.I. du Pont Nemours and Company. As shown in FIG. 10, sample A retained a much greater percentage of its impact strength at all stages of hot air testing.

Example 10

Laboratory testing was conducted to simulate exhaust gas recovery (EGR) condensate effects on parts made of the thermoplastic compositions of the current invention. To produce the simulated EGR condensate, 4 ml of HNO3 and 1.4 ml H2SO4 acid were added to 500 ml demineralized water. Next, 1.65 gm of NaCl3 was further added to the solution and makeup demineralized water was added to bring the volume of the total solution to 1000 ml. Tensile bars from embodiments of the current invention were exposed to the simulated EGR condensate for 10 minutes (and wiped after exposure) to simulated EGR conditions. The tensile bars were formed with a nylon 6,6 base resin commercially available from INVISTA under the trade name TORZEN™ U4800 NC01 and contained 1-5% by weight of a small particle polyhydric alcohol (80% of the PHA particles have a particle size below 40 microns). The bars were dried at 50° C. for 15 minutes. Test tensile properties were tested and then the tensile bars were heat aged for 18 hours at 210° C., 220° C. and 240° C. The tensile bars were found to retain greater than 70% of initial properties under all of the test conditions described here It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also the individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±8%, or ±10%, of the numerical value(s) being modified. In addition, the phrase "about 'x' to 'y'" includes "about 'x' to about 'y'"

While the illustrative embodiments of the invention have been described with particularity, it will be understood that the invention is capable of other and different embodiments and that various other modifications will be apparent to and may be readily made by those skilled in the art without departing from the spirit and scope of the invention. Accordingly, it is not intended that the scope of the claims hereof be limited to the examples and descriptions set forth herein but rather that the claims be construed as encompassing all the features of patentable novelty which reside in the present disclosure, including all features which would be treated as equivalents thereof by those skilled in the art to which the invention pertains.

What is claimed:

1. A thermoplastic composition consisting of: a) a polyamide resin; b) 2-5% of a polyhydric alcohol in the form of particles, wherein 80% of the polyhydric alcohol particles have a particle size of 40 microns or less; and c) and one or more additives selected from the group consisting of lubricants, glass fillers, mineral fillers, impact modifiers, plasticizers, pigments, dyes, antioxidants, heat stabilizers, hydrolysis stabilizers, nucleating agents, drip suppressants, blowing agents and combinations thereof, said thermoplastic composition exhibiting improved retention of tensile strength, elongation and unnotched charpy over thermoplastic compositions with polyhydric alcohols with particle sizes greater than 70 microns.

2. The thermoplastic composition of claim 1 wherein the polyhydric alcohol is selected from a group consisting of monopentaerythritol (MPE), dipentaerythritol (DPE), tripentaerythritol (TPE) or combinations thereof.

3. The thermoplastic composition of claim 1 wherein one or more of the additives is glass fillers selected from the group consisting of glass fibers, glass flakes, glass beads and combinations thereof.

4. The thermoplastic composition of claim 3 wherein the glass fillers are hydrolysis resistant glass fibers coated with a sizing composition and organosilane coupling agents.

5. The thermoplastic composition of claim 1 wherein one or more of the additives is mineral fillers selected from the group consisting of kaolin, clay, talc, and wollastonite, diatomite, titanium dioxide, mica, amorphous silica and combinations thereof.

6. The thermoplastic composition of claim 1 wherein one or more of the additives is an impact modifier comprising an elastomeric polyolefinic polymer functionalized with an unsaturated carboxylic anhydride.

7. The thermoplastic composition of claim 1 wherein one or more of the additives is an impact modifier comprising a maleic anhydride functionalized elastomeric ethylene copolymer, a maleic anhydride functionalized elastomeric ethylene/propylene copolymer, a terpolymer of ethylene, acrylic ester and maleic anhydride, a maleic anhydride grafted (MAH) polyolefin elastomer or combinations thereof.

8. The thermoplastic composition of claim 1 wherein one or more of the additives is a lubricant selected from the group consisting of a metal stearate, ethylene bis-stearamide and combinations thereof.

9. The thermoplastic composition of claim 1 wherein one or more of the additives is a synergist selected from a group consisting of antimony trioxide, zinc borate, polyhydric alcohol and combinations thereof.

10. The thermoplastic composition of claim 1 wherein one or more of the additives is a synergist selected from the group consisting of monopentaerythritol (MPE), dipentaerythritol (DPE), tripentaerythritol (TPE) and combinations thereof.

11. The thermoplastic composition of claim 1 wherein one or more of the additives is the drip suppressant polytetrafluoroethylene.

12. The thermoplastic composition of claim 1 wherein, after 1000 hours of hot air testing at 210° C., the thermoplastic composition is capable of retaining greater than 65% of its tensile strength and greater than 50% of its elongation and impact resistance.

13. The thermoplastic composition of claim 1 wherein, after 1000 hours of hot air testing at 210° C., the thermoplastic composition is capable of retaining greater than 90% of its tensile strength and greater than 65% of its elongation and impact resistance.

14. The thermoplastic composition of claim 1 wherein the polyamide is selected from a group consisting of Nylon 6, Nylon 6,6, Nylon 6,12, Nylon 4,6, Nylon 6,10, Nylon 7, Nylon 10, Nylon 10, 10, Nylon 12, Nylon 12, 12, Nylon 6T, Nylon 6T/6I, Nylon 6T/DT, Nylon MXD-6 and combinations thereof.

15. The thermoplastic composition of claim 1 wherein the polyamide is Nylon 6,6.

16. An ethylene glycol resistant thermoplastic article consisting of the thermoplastic composition of claim 1.

17. A molded or extruded thermoplastic article consisting of the thermoplastic composition of claim 1.

18. A molded or extruded thermoplastic article consisting of the thermoplastic composition of claim 1 for use in exhaust gas recovery systems.

* * * * *